(12) United States Patent
Millet et al.

(10) Patent No.: US 10,798,939 B2
(45) Date of Patent: Oct. 13, 2020

(54) CELLULOSE BINDING DOMAIN CHITOSAN SEED COATING

(71) Applicant: Board of Education of the Vocational Schools in the County of Bergen, Paramus, NJ (US)

(72) Inventors: Alon Millet, Franklin Lakes, NJ (US); Donna Leonardi, New Milford, NJ (US)

(73) Assignee: BOARD OF EDUCATION OF THE VOCATIONAL SCHOOLS IN THE COUNTY OF BERGEN, Paramus, NJ (US)

( * ) Notice: Subject to any disclaimer, the term of this patent is extended or adjusted under 35 U.S.C. 154(b) by 712 days.

(21) Appl. No.: 15/259,540

(22) Filed: Sep. 8, 2016

(65) Prior Publication Data

US 2017/0064901 A1 Mar. 9, 2017

Related U.S. Application Data

(60) Provisional application No. 62/215,232, filed on Sep. 8, 2015.

(51) Int. Cl.
*A01N 43/16* (2006.01)
*A01N 25/00* (2006.01)

(52) U.S. Cl.
CPC ............ *A01N 43/16* (2013.01); *A01N 25/00* (2013.01)

(58) Field of Classification Search
CPC .................. A01N 43/16; A01N 25/00
See application file for complete search history.

(56) References Cited

U.S. PATENT DOCUMENTS 4,886,541 A * 12/1989 Hadwiger ............... A01N 43/16
504/100

FOREIGN PATENT DOCUMENTS

WO WO-03106490 A1 * 12/2003 ............. A01N 37/46
WO WO-2012025621 A1 * 3/2012 ............. C07K 16/16

OTHER PUBLICATIONS

Mma, Mondal, Foliar Application of Chitosan on Growth and Yield Attributes of Mungbean (*Vigna Radiata* (L.) *Wilczek*), 2013, Bangladesh J. Bot., vol. 42, Issue 1, pp. 179-183. (Year: 2013).*
Blake, A.W. et al., Understanding the Biological Rationale for the Diversity of Cellulose-directed Carbohydrate-binding Modules in Prokaryotic Enzymes, 2006, The Journal of Biological Chemistry, vol. 281, No. 39, pp. 29321-29329. (Year: 2006).*
Levy, I., & Shoseyov, O. "Cellulose-binding domains: biotechnological applications" Biotechnology advances, 20, pp. 191-213; doi: 10.10 16/S0734-9750(02)00006-X, Oct. 31, 2002.
Shpigel, et al., Bacterial cellulose-binding domain modulates in vitro elongation of different plant cells. Plant physiology, Jul. 31, 1998 pp. 1185-1194.
Pauly, M., et al., Cell-wall carbohydrates and their modification as a resource for biofuels. The Plant Journal for Cell and Molecular Biology. doi: 1O.1111/j.1365-313X.2008.03463.x 00S, 2008, pp. 559-568.
Abramson et al., Plant cell wall reconstruction toward improved lignocellulosic production and processability. Plant Science, 178, 2010, pp. 61-72, doi: : 10. 1016/j.plantsci.2009, 11.003.

* cited by examiner

*Primary Examiner* — John Pak
*Assistant Examiner* — Andriae M Holt
(74) *Attorney, Agent, or Firm* — McCarter & English, LLP; Michael R. Friscia; Yu Lu

(57) ABSTRACT

The invention provides a cellulose binding domain-chitosan coated seed and methods of preparing the same.

13 Claims, 9 Drawing Sheets

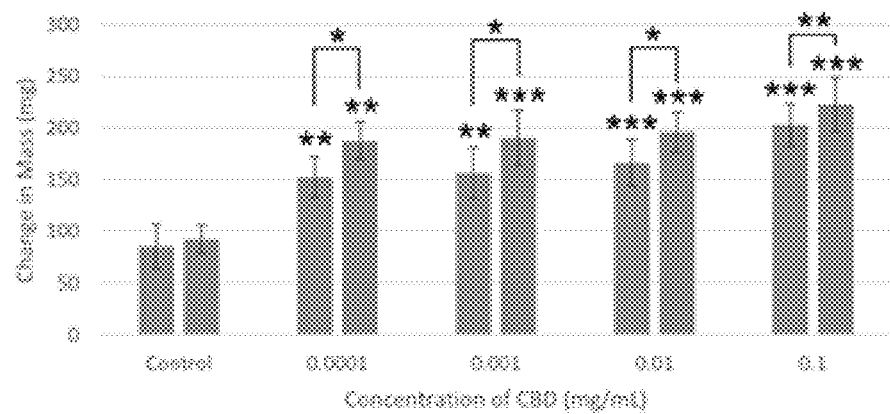
FIG. 1A  The Effect of CBD on Change in Mass in *V. radiata*
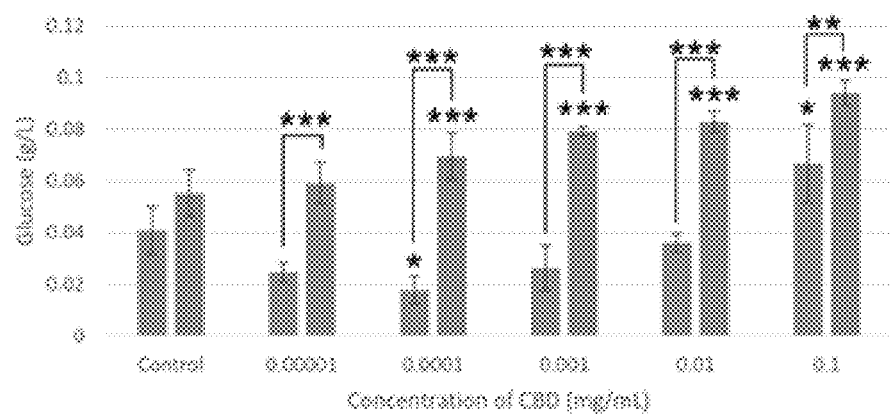
FIG. 1B  The Effect of CBD on Free Glucose Concentration in *V. radiata*
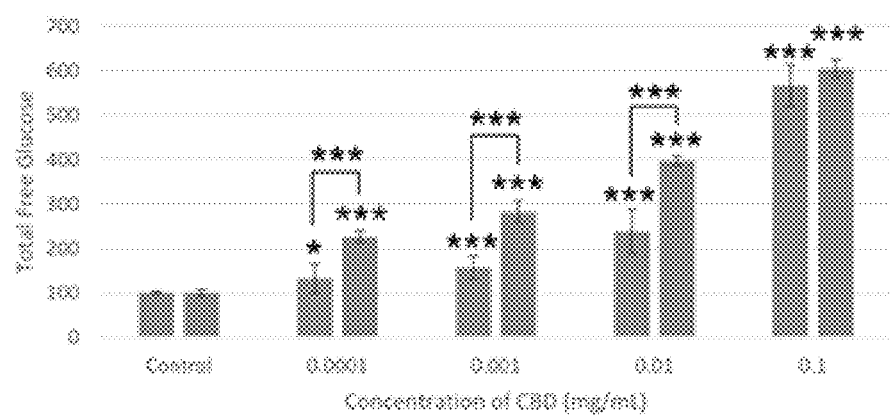
FIG. 1C  The Effect of CBD on Total Free Glucose in *V. radiata*

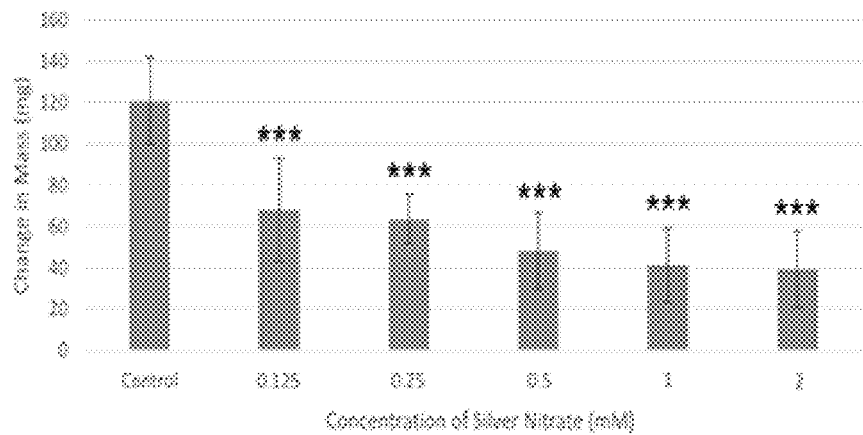
FIG. 3A  The Effect of Silver Nitrate on Change in Mass in *V. radiata*
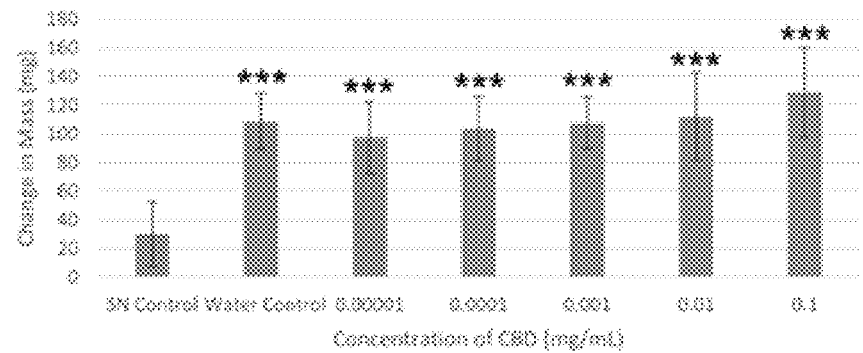
FIG. 3B  The Effect of CBD and Silver Nitrate on Change in Mass in *V. radiata*
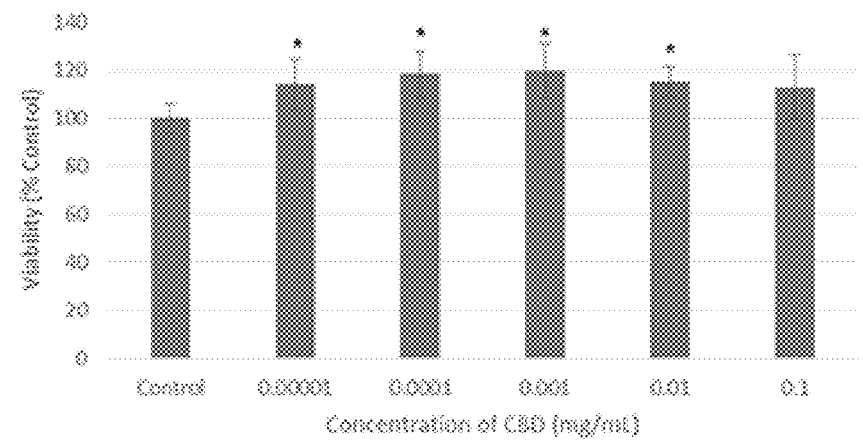
FIG. 3C  The Effect of CBD on Human Keratinocytes

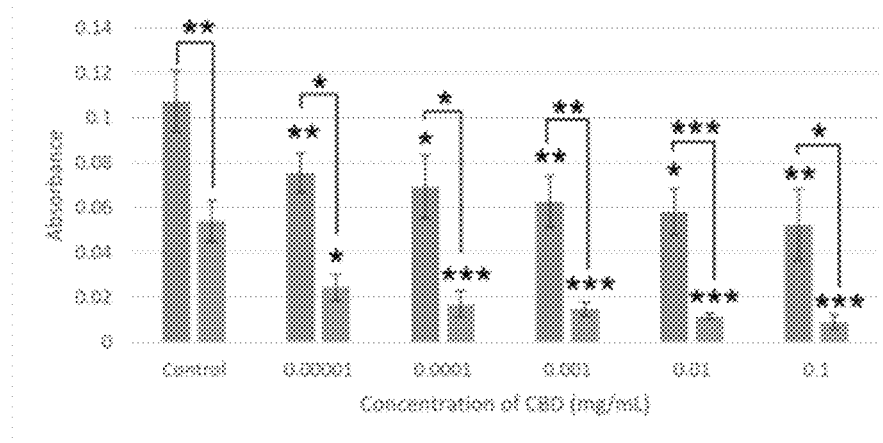
FIG. 9A The Effect of CBD and Chitosan on Microbial Growth
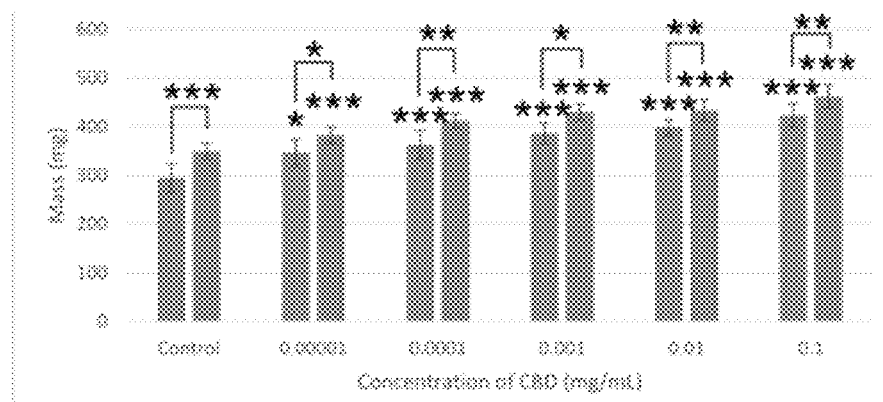
FIG. 9B The Effect of Chitosan Seed Coatings on Mass

CELLULOSE BINDING DOMAIN CHITOSAN SEED COATING

REFERENCE TO RELATED APPLICATION

This application claims the benefit of the filing date, under 35 U.S.C. § 119(e), of U.S. Provisional Application No. 62/215,232, filed on Sep. 8, 2015, the entire contents of which, including the drawings, are incorporated herein by reference.

BACKGROUND OF THE INVENTION

Cellulose binding domain 4 (CBD4), also known as carbohydrate binding module 4 (CBM4), represents one of over 60 families of carbohydrate binding modules (CBMs), each of which present as the non-catalytic component of the various microbial cellulases. CBD's are produced natively by fungi such as *Trichoderma reesei* and bacteria such as *Cellulomonas fimi*, the organism in which CBD4 was first described (Levy, I., & Shoseyov, O. "Cellulose-binding domains: biotechnological applications" Biotechnology advances. doi:10.1016/S0734-9750(02)00006-X, 2002, Oct. 31). Over the past few decades, various CBD's have emerged as molecules of significant interest with regard to the genetic modification of wood producing plants for their ability to increase biomass yield, principally for paper and wood production (Shpigel, et al., Bacterial cellulose-binding domain modulates in vitro elongation of different plant cells. Plant physiology 1998, Jul. 31 pp 1174-1185).

CBD4, from *Cellulomonas fimi*, includes two cellulose-binding domains, CBD(N1) and CBD(N2), which are found in tandem at the N terminus of the 1,4-beta-glucanase, CenC enzyme. These domains are selective for binding amorphous, non-crystalline cellulose. When produced by *C. fimi*, CBD4 is believed to act by binding to cellulose microfibrils, adsorbing to microcracks in the cell wall, penetrating the interfibrillar space, and pulling in water to promote hydrolysis, thereby generating glucose monomers for energy production by the organisms. (Pauly, M., et al., Cell-wall carbohydrates and their modification as a resource for biofuels. The Plant Journal for Cell and Molecular Biology. doi:10.1111/j.1365-313X.2008.03463.x 2008, Apr. 30). Exogenous administration of various CBDs, such as CBD4, has been shown to modulate cellulose biosynthesis and biomass in a concentration dependent manner (Abramson et al., Plant cell wall reconstruction toward improved lignocellulosic production and processability. Plant Science. doi: 10.1016/j.plantsci.2009.11.003). CBDs being the noncatalytic subdomain of cellulases, provide a substrate, but do not cleave β-1,4 glycosidic bonds to generate glucose monomers from cellulose.

With research providing evidence of increased biomass, an even more significant utilization of CBD's effects may be for food production, specifically in developing countries. *V. radiata* (mung bean) is one of the most important pulse crops in Southeast Asia and India. Its high nutritional value and palatability make it popular as a simple method of completing a healthy diet, and its availability and simple growth requirements make it widely used on a highly localized level. The mung bean is so nearly homogeneously utilized that many studies have been undertaken to investigate the possibility of its genetic manipulation for biofortification (Nair et al., Cell-wall carbohydrates and their modification as a resource for biofuels. The Plant Journal: for cell and molecular biology. doi:10.1111/j.1365-313X.2008.03463.x 2008, Apr. 30). As the world population steadily increases, agriculturists are constantly tackling the problem of how to achieve more yield from of every plant that is grown. As such, there is a need to develop a new method to increase agricultural yield of the mung bean.

SUMMARY OF THE INVENTION

The present invention is based, at least in part, on the discovery that germinating and growing a seed (such as *V. radiata*) hydroponically in the presence of aqueous cellulose binding domain (CBD) or with a CBD-chitosan seed coating may increase agricultural yield.

The invention is related to a CBD-chitosan seed coat, comprised of a seed coating of CBD added to a solution of chitosan which is allowed to dry adherent to the seed.

In a first embodiment the invention provides a seed comprising a coating, said coating comprising a cellulose binding domain (CBD) polypeptide and chitosan.

A second embodiment the invention provides a seed according to the first embodiment of the invention, wherein the CBD polypeptide is cellulose binding domain 4 (CBD4).

In a third embodiment the invention provides a seed according to any of the foregoing embodiments, wherein the seed is a *Vigna radiata* seed.

In a fourth embodiment the invention provides a seed according to any of the foregoing embodiments, wherein the seed is coated by contacting an uncoated seed with a solution of CBD polypeptide and chitosan.

In a fifth embodiment the invention provides a seed according to any of the foregoing embodiments, wherein the solution has a CBD concentration of about 0.01 mg/mL, and a chitosan solution of about 0.2 M.

In a sixth embodiment the invention provides a method to coat a seed, comprising: contacting a seed with a solution comprising chitosan and cellulose binding domain polypeptide.

In a seventh embodiment the invention provides a method according to any of the foregoing embodiments, wherein the cellulose binding domain polypeptide is cellulose binding domain 4.

In an eighth embodiment the invention provides a method according to any of the foregoing embodiments, wherein the seed is a *V. radiata* seed.

In a ninth embodiment the invention provides a method according to any of the foregoing embodiments, wherein the first solution has a CBD concentration of about 0.01 mg/mL and a chitosan concentration of about 0.2 M.

In a tenth embodiment the invention provides a method according to any of the foregoing embodiments, wherein the seed is grown either hydroponically or in soil.

In an eleventh embodiment the invention provides a method according to any of the foregoing embodiments, wherein the seed is grown in chemically or biologically contaminated water or soil.

In a twelfth embodiment the invention provides a method according to any of the foregoing embodiments, wherein the seed is grown for purposes of either agriculture or biofuel production.

In a thirteenth embodiment the invention provides a method to soak a seed in a CBD solution during the germination and growth period until the sprout is harvested or to provide a bolus dose administration at the initiation of the germination process.

In the methods described above, the CBD is CBD4, specifically, and the seed is *Vigna radiata*, or the common mung bean and shall here forward be referred to as "CBD".

BRIEF DESCRIPTION OF THE DRAWINGS

FIG. 1a shows the effects of CBD on change in mass of *V. radiata*. FIG. 1b shows the effects of CBD on free glucose concentration in *V. radiata*. FIG. 1c shows the effects of CBD on total free glucose in *V. radiata*. Specifically, the left bar of each pair is bolus single-administration, the right bar of each pair is multiple-administration. In FIG. 1a, the change in mass from d.4 to d.8 was computed. In FIG. 1b, free glucose (d.8) was found using an absorbance assay which stoichiometrically related the quantity of reduced $NADP^+$ to the amount of oxidized D-glucose in a redox reaction. In FIG. 1c, total free glucose was defined as the product of free glucose concentration and change in mass. Bars are means±STDEV, n=8. *=$p<0.05$, =$p<0.01$, *=$p<0.001$.

In FIG. 2a: On d.8, beans were measured with a caliper from three different points and the measurements were averaged. In FIG. 2b: On d.8, material stiffness was measured by a three-point flexural test, governed by the equation $EI=FL3/12y$, where E is material stiffness, I is the second moment of inertia, F is force, L is length of shoot, and y is displacement. In FIG. 2c, on d.8, number of root hairs were counted. Bars are means±STDEV, n=8. *=$p<0.05$, =$p<0.01$, *=$p<0.001$.

FIG. 3a shows the effects of silver nitrate on change in mass in *V. radiata*. FIG. 3b shows the effects of CBD and silver nitrate on change in mass in *V. radiata*. FIG. 3c shows the effects of CBD on human keratinocytes. Specifically, the figures show trials determined the toxicity and countertoxicity of CBD in vitro. In FIG. 3a: Beans were grown hydroponically in concentrations of silver nitrate to verify the activity of silver nitrate as a toxic agent. In FIG. 3b: Beans were grown hydroponically in respective concentrations of CBD with 1 mM AgNO3. Significance is in comparison to silver nitrate control. In FIG. 3c, CBD was added to the growth media of human keratinocytes to evaluate toxicity as it relates to cell viability. Viability was determined with an MTS assay. Bars are means±STDEV, n=8. *=$p<0.05$, ***=$p<0.001$.

FIG. 4a shows SEM micrograph of a *V. radiata* stem with no CBD administered. Note the crystallinity and linearity of the fibers. FIG. 4b shows SEM micrograph of a *V. radiata* stem with 0.01 mg/mL CBD administered in bolus dose. Note the irregularity of fibers. FIG. 4c shows SEM micrograph of a *V. radiata* stem with 0.01 mg/mL CBD, multiple-administration. Note the crystallinity and linearity of fibers.

FIG. 5a shows Untreated sample. Note the thinness and consistency of the cell wall. FIG. 5b shows sample treated with 0.01 mg/mL CBD. Note the thickness and spacing of the cell wall. FIG. 5c shows sample treated with 0.1 mg/mL CBD. Note the fibrillation and increase in cellular membrane. P is primary cell wall, S1 and S2 are layers of the secondary cell wall, CY is cytoplasm, M is mitochondria, C is chloroplast, ML is middle lamella, F is fibrillation, and V is vacuole.

In FIG. 8a, a salicylic acid ELISA assay was used to measure concentration as a function of absorbance (450 nm). In FIG. 8b, an abscisic acid ELISA assay was used to measure concentration as a function of absorbance (450 nm). In FIG. 8c, an auxin ELISA assay was used to measure concentration as a function of absorbance (450 nm). In FIG. 8d, a cytokinin ELISA assay was used to measure concentration as a function of absorbance (450 nm). In FIG. 8e, a gibberellic acid ELISA was used to measure concentration as a function of absorbance (450 nm). Bars are means±STDEV, n=8. *=$p<0.05$, =$p<0.01$, *=$p<0.001$.

FIG. 9a shows the effects of CBD and chitosan on microbial growth. FIG. 9b shows the effects of chitosan seed coatings on mass. Beans were grown hydroponically in respective concentrations of CBD. In FIG. 9a, on the third day of growth 100 μL of the water from each well was taken and absorbance was measured at 630 nm. FIG. 9b shows the mass of mung bean sprout on day 8. Blue bar is multiple-administration, orange bar is chitosan-CBD coating. Bars are means±STDEV, n=8. *=$p<0.05$, =$p<0.01$, *=$p<0.001$.

DETAILED DESCRIPTION OF THE INVENTION

Figure 2A:
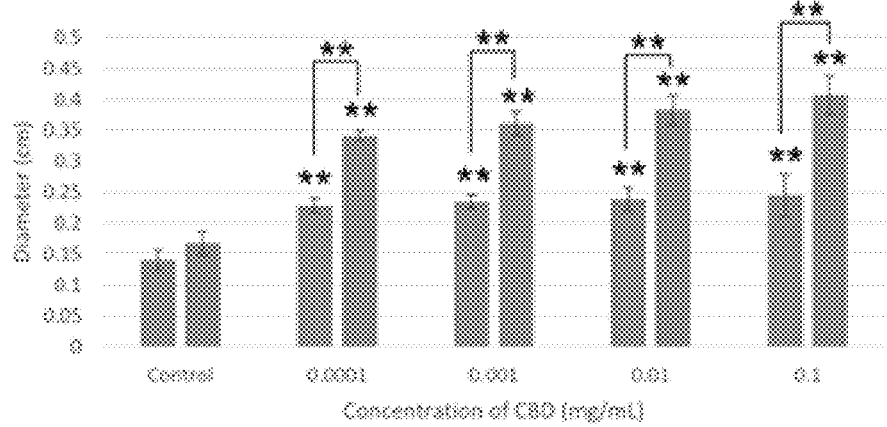
FIG. 2a shows the effects of CBD on diameter of *V. radiata*.

In this present invention, three novel methods of treating plants with CBD hydroponically to increase biomass were described. They include a bolus administration, a multiple dose administration, and a seed coating containing CBD administered prior to germination. Coating seeds prior to germination with a CBD-chitosan seed coating appears from preliminary studies to be most promising. Chitosan seed coatings have been found to themselves increase biomass, impart antimicrobial and antifungal properties, and reduce germination time. The foundation for a fundamental understanding of CBD's mechanism has also been laid, with microscopy work as well as molecular and phytohormonal studies establishing the existence of a multifaceted mechanism. Moreover, many of yet undescribed effects of CBD have been elucidated, each of which exhibiting potential in agriculture and phytobiology.

In order to determine the effects of CBD on *V. radiata*, fundamental morphological and biomechanical properties of the plant were measured, including mass, diameter, material stiffness, and number of root hairs. SEM and TEM imaging and computational image analysis were used to qualify cellulose microfibrils as well as cell wall structure and composition. A free glucose assay was used to investigate the applicability of CBD to modulating glucose availability. Phytohormonal assays were used to further elucidate the mechanism of action of CBD. In addition, in vitro toxicity trials were used to investigate whether ingestion of CBD could have deleterious effects on human health and the ability of the CBD to neutralize an environmental toxin was evaluated, both of which have not yet been described in the literature. Multiple-administration, bolus dose, and CBD-chitosan coated seed models were used to identify more effective methods of administering CBD to plants.

Methods

Growth Conditions of *V. radiata* and Biomass Measurements

For bolus dose administration, two seeds of *V. radiata* (American Educational Products, Chippewa Falls, Wis.) between 65 and 75 mg were grown in each well of a 24-well tissue culture plate (Costar, New York, N.Y.) over 8 days. On day one, 500 μL of a CBD (SigmaAldrich, St. Louis, Mo.) solution (0-0.1 mg/mL) was administered to the seeds, with four replicates of each concentration being evaluated. For two days beans were allowed to germinate hydroponically, covered in the dark at 20° C. On day 3 the plate was incubated at 20° C./12 hr photoperiod and 100% humidity, and 500 μL of distilled water was added to each well. On day 5, another 750 μL of distilled water was added and the cover of the well plate was removed. On day 4 and day 8 beans were massed, change in mass calculated and biomechanics were measured. On day 8 plant tissue was prepared for phytohormonal evaluation, HPLC, SEM, and TEM.

In multiple-dose administration environmental growth conditions remained the same as those for bolus dose; however, 125 μL of CBD solution (0-0.1 mg/mL) with 375 μL of distilled water was given on day 1 and day 3 and 250 μL of CBD solution (0-0.1 mg/mL) with 500 μL of distilled water as given on day 5 to equal the total summative mass of CBD administered in bolus dose administration across each concentration tested. On day 4 and day 8 beans were massed and change in mass calculated.

To create CBD-chitosan coatings, seeds were submerged in a dilute solution comprised of 200 μL CBD concentrations (0-0.1 mg/mL) mixed with 800 μL of chitosan solution (SigmaAldrich) in acetic acid (SigmaAldrich) 10% w/v brought to pH 6 with NaOH (SigmaAldrich). The seeds were allowed to sit in solution for 24 h at 20° C. before air-drying at RT for 24 h. Seeds were grown hydroponically in the aqueous environmental growth conditions described above with the exception of no additional CBD was administered beyond that in the seed coating. On day 8 beans were massed and change in mass calculated.

Countertoxicity with $AgNO_3$

To determine the EC50 of $AgNO_3$, two seeds of *V. radiata* were grown in each well of a 24 well plate over 8 days in 500 μL of concentrations of silver nitrate (SigmaAldrich) ranging from 0-2 mM. For two days beans were allowed to germinate in the dark at 20° C. as described above. On day 3, the plate was incubated at 20° C./12 hr photoperiod and 100% humidity, and 500 μL of distilled water were added to each well. On day 5 another 750 μL of distilled water were added and the cover of the well plate was removed. The EC50 was determined as the concentration at which the change in mass of the seedling was half that of untreated *V. radiata*. To measure the countertoxic effect of CBD on $AgNO_3$-treated *V. radiata*, two seeds were grown in each well of a 24 well plate over an 8 day period, using the bolus dose administration described above, in concentrations of CBD ranging from 0-0.1 mg/mL and $AgNO_3$ at 1.0 mM administered on day one.

Three-Point Flexural Test

On day 8, bean sprouts treated with a bolus dose of CBD (0-0.1 mg/mL) were secured by plywood and C-clamps, 4 cm apart, and a 0.2N mass was hung from the center of the shoot. Force was measured with a spring scale and material stiffness was calculated from the equation $EI=FL^3/12y$ using methods previously described (Schopfer, P. Biomechanics of plant growth. *American Journal of Botany*, 93(10), 1415-1425. doi:10.3732/ajb.93.10.14150).

Colorimetric Assay for Free Glucose

On day 8 using the bolus dose administration methodology, a K-GLUC assay (Megazyme, Bray, Ireland) was used to measure the concentration of free glucose as per company protocol. Briefly, aqueous homogenates were created from sprouts treated with CBD (0-0.1 mg/mL) at concentrations of 5 mg/mL (w/v) and heated in 60° C. water for 10 minutes. 200 μL of distilled water was pipetted into each well of a 96 well plate, and 10 μL of samples, standards, and distilled water was pipetted into their respective wells. 10 μL of buffer solution and NADP+/ATP solution were pipetted into each well and absorbance was read at 450 nm after 3 min. 2 μL of HK/G-6-PDH solution was then added and absorbance was read after five minutes. Concentration of free D-glucose was calculated as $\Delta A_{solution}$ over $\Delta A_{standard}$ times concentration of standard.

Scanning Electron Microscope (SEM) Sample Preparation for *V. radiata*

On day 8, beans were sectioned from the root-stem junction to the stem-leaf junction and were placed in SEM fixative (5% glutaraldehyde in PBS). Plants were post-fixed with 2% osmium tetroxide, dehydrated in a graded series of ethanol, critical point dried, mounted on aluminum pins and coated with carbon. Samples were imaged with an FEI Quanta 200 3D scanning electron microscope.

Transmission Electron Microscopy (TEM) Sample Preparation for *V. radiata*

On day 8, beans were sectioned at the root and were placed in TEM fixative (5% glutaraldehyde/4% formaldehyde). Plants were post-fixed with 2% osmium tetroxide, dehydrated in a graded series of acetone, embedded and cured in Spurr's epoxy resin. 100 nm sections were cut and placed on 200 mesh copper TEM grids. Grids were stained with 2% uranyl acetate followed by 0.5% lead citrate and imaged at 200 kV with a JEOL JEM 2100 transmission electron microscope.

Toluidine Blue-O Stain Preparation and Imaging

On day 8, beans were sectioned at the stem-root junction at thickness 190 μm with a Vibratome 3000 Plus. Sections were stained with 10 μL of 0.01% toluidine blue-O stain solution for 30 s and washed with 100 μL of distilled water. Sections were imaged using a Leica light microscope (40×). ImageJ was used to develop color histograms for images, and means were used for cell wall composition determination.

Determination of Toxicity of CBD In Vitro

HaCaT keratinocytes (AddexBio, San Diego, Calif.), were cultured in DMEM/F12 (Invitrogen, Carlsbad, Calif.), supplemented with 5% fetal bovine serum (Invitrogen) and 1% penicillin-streptomycin (Invitrogen). Cells were incubated at 37° C. and 5% $CO_2$. Cells were then seeded at a density of $1\times10^4$ cells per well in 100 μL of media in a 96-well tissue culture plate and incubated for 24 h. Cells were then treated with final concentrations of CBD (0-0.1 mg/mL) and allowed to incubate. After 24 h, 15 μL of CellTiter 96® Aqueous One Reagent (Promega, Madison, Wis., USA) was added to each well. The well plate was subsequently incubated for 2 h at 37° C. in a humidified, 5% $CO_2$ condition. Absorbance was read using a microplate reader (BioTek ELx808; Winnoski, Vt.) at 490 nm.

Sample Preparation for Phytohormonal Assays

Indirect ELISAs (MyBioSource, San Diego, Calif.) was performed for abscisic acid, gibberellic acid, salicylic acid, auxin, and cytokinin, as per company protocol. Briefly, multiple administration treated CBD samples were prepared by lyophilizing bean sprouts which were subsequently homogenized at 333 mg/mL of plant tissue in PBS. These solutions were then used as the samples in the indirect ELISAs.

Quantification of Colony Forming Units

In order to determine the microbial growth in the growth water of seedlings, the absorbance of 100 μL of supernatant water at 630 nm was used with the verified conversion factor of $10^6$ CFU per absorbance of 0.1 as per Goldman, Emanuel; Green, Lorrence H (24 Aug. 2008). *Practical Handbook of Microbiology, Second Edition* (Google eBook) (Second Edition ed.). USA: CRC Press, Taylor and Francis Group. p. 864. ISBN 978-0-8493-9365-5.

Statistical Analysis

A Student's t-test was used for statistical analysis, with $\alpha=0.05$ and $n\geq8$. Assays were performed 3 or more times. Unless otherwise noted, bolus dose was used as the mechanism of administration of CBD.

Results

CBD Modulates Biomass and Free Glucose

The two most crucial uses for plants materials in an agricultural context are for food and biofuel production. In the context of food, a greater biomass would imply a more expansive food source. As seen in FIG. 1a, CBD increased the change in mass of *V. radiata* in a dose-response fashion both in bolus dose administration and in multiple administration, with multiple administration significantly more effective than bolus dose ($p<0.05$).

For biofuel production, the chief deciding factor is free glucose concentration. Since ethanol is simply fermented glucose, the concentration of glucose is directly proportional to the potential yield of biofuel from the plant. As seen in FIG. 1b, data showed that treated plants exhibited significantly higher free glucose concentrations per unit mass only with multiple administration from 0.0001 mg/mL to 0.1 mg/mL ($p<0.05$), where bolus dose administration showed a biphasic change in concentration in the same range ($p<0.05$). Multiple administration was significantly more effective than bolus dose administration with regard to modulating free glucose ($p<0.05$).

Total free glucose, a novel method for quantifying yield potential from a plant introduced by this study, is defined as the product of plants mass and free glucose concentration per unit mass. Thus, it is an indicator of not only a changing concentration but also of a total free glucose available per plant. This makes total free glucose a key concept for quantification of "usefulness" of plants. As seen in FIG. 1c, both bolus dose and multiple administration of CBD from 0.0001 mg/mL to 0.1 mg/mL were significantly higher than the control ($p<0.05$), with multiple administration significantly greater than bolus dose administration across most concentrations ($p<0.05$).

CBD Modulates Plant Biomechanics

A plant may be theoretically more viable or able to produce more of a desired product than another variant, but if it is not hardy and able to survive in a harsh agricultural setting, it is neither helpful nor useful. As such, biomechanical properties of the plants were measured to determine if treated plants would be better suited to growth outside the lab.

As seen in FIG. 2a, the diameter of *V. radiata* was measured with a calipers with implications for the qualitative strength of the stem. Data showed that diameter increased significantly from 0.0001 mg/mL to 0.1 mg/mL in both bolus dose and multiple administration ($p<0.05$), and that multiple administration demonstrated a significantly higher average stem diameter than bolus dose ($p<0.05$).

Figure 2B:
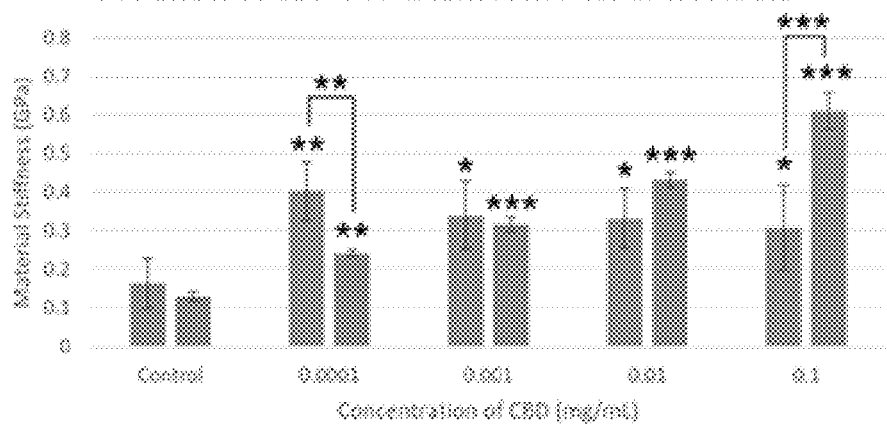
FIG. 2b shows the effects of CBD on material stiffness in *V. radiata*.

As seen in FIG. 2b, material stiffness, calculated as $E=FL^3/12Iy$, is a property of a particular material in a three-point flexural test to determine distance moved with applied force. Data showed that both bolus dose and multiple administration exhibited significantly greater material stiffness than the untreated control across all concentrations of CBD ($p<0.05$), however as the concentration of CBD increased, the relationship between bolus dose and multiple administration demonstrated an inverse relationship. Material stiffness was significantly greater in bolus dose administration at the lowest concentration of CBD ($p<0.01$) while multiple administrations of CBD exhibited a greater material stiffness at higher concentrations of CBD ($p<0.001$). This is an interesting phenomenon and warrants further investigation.

Figure 2C:
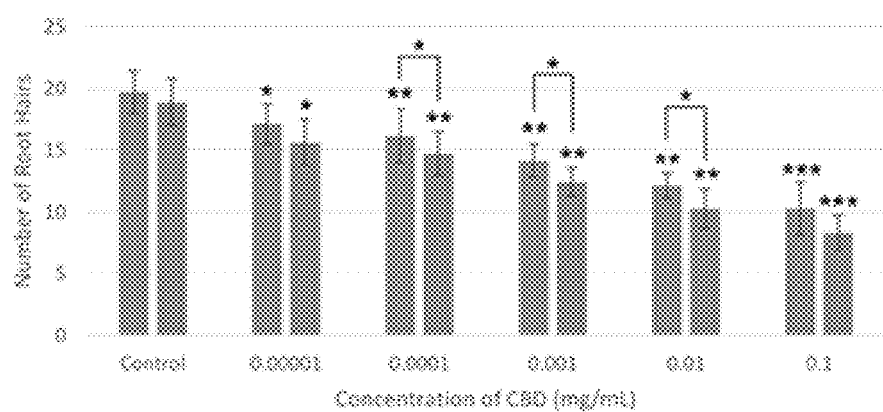
FIG. 2c shows the effects of CBD on number of root hairs in *V. radiata*. Specifically, the left bar of each pair is single-administration, the right bar of each pair is multiple-administration.

As seen in FIG. 2c, the number of root hairs, potentially having implications in water uptake and drought resistance, is affected by CBD administration. Data showed an inverse dose response relationship ($p<0.05$), with multiple administration showing significantly fewer root hairs than bolus dose ($p<0.05$).

Toxicity of CBD and Countertoxicity of CBD

In order to determine the effects of CBD in reversing the negative effect of common ground toxins, *V. radiata* was grown in solutions of $AgNO_3$ (0-2 mM), a molecule which has the potential to induce oxidative stress. Change in sprout mass was measured from day 4 to day 8 as an indicator of toxicity. As seen in FIG. 3a, the beans change in mass decreased significantly in a dose response fashion when treated with all bolus doses of silver nitrate ($p<0.001$).

Subsequently as seen in FIG. 3b, plants were grown in concentrations of CBD ranging from 0.00001 mg/mL to 0.1 mg/mL along with 1 mM $AgNO_3$ and mass was measured. The data showed complete normalization of the mass, with all concentrations of CBD significantly higher than the $AgNO_3$ control ($p<0.001$) and none significantly different from the water control.

In order to determine whether CBD has potential detrimental effects on human health, human keratinocytes (HaCaT) were grown for 24 h in growth media containing concentrations of CBD ranging from 0.00001 mg/mL to 0.1 mg/mL and viability was measured with an MTS assay. As seen in FIG. 3c, the data exhibited a low dose proliferative effect with viability increasing significantly at low concentrations ($p<0.05$) and demonstrating no significant difference from the untreated control at higher concentrations.

CBD Modulates Crystallinity of Cellulose Fibers

In order to qualitatively examine the effect of CBD on *V. radiata* on a subcellular, microstructural level, scanning electron microscopy and transmission electron microscopy were utilized.

Figure 4A:
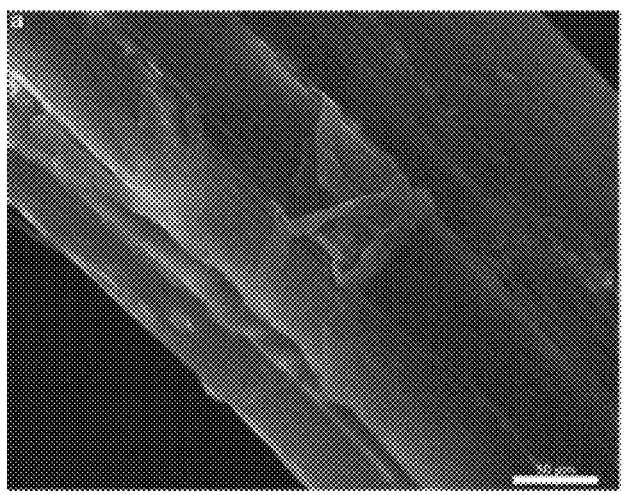
FIGS. 4a-4c show SEM micrographs of *V. radiata* stem with no CBD administered, 0.01 mg/mL CBD administered in bolus dose, and 0.01 mg/mL CBD, multiple-administration, respectively.
Figure 4B:
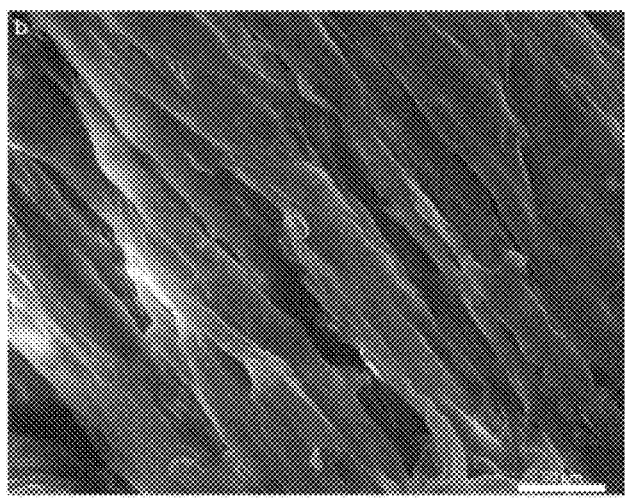
Figure 4C:
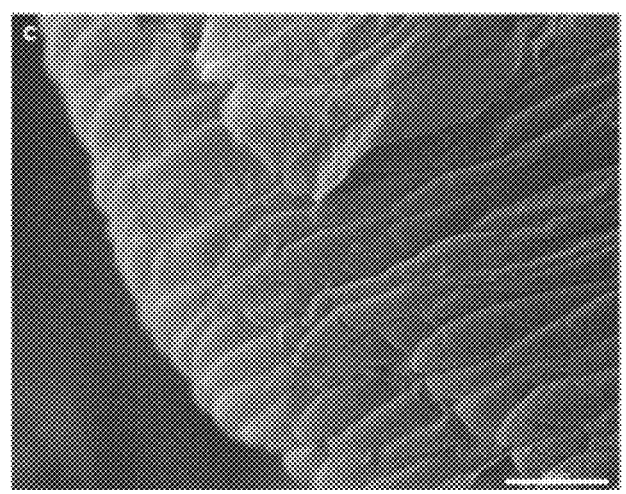

In scanning electron microscopy, small sections of the stem-root junction of *V. radiata* treated with 0.01 mg/mL of CBD in both bolus dose and multiple administration and were imaged along with a control sample. As seen in FIG. 4, images suggest the crystallinity of cellulose fibers appeared reduced in the bolus dose sample with a possible increase in amorphogenesis (FIG. 4b). Crystallinity appeared unchanged between the control and the multiple administration plant as seen in FIG. 4c.

Figure 5A:
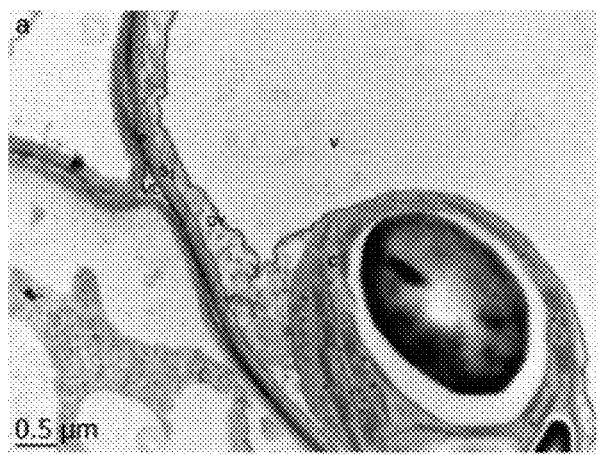
FIGS. 5a-5c show TEM micrographs of *V. radiata* stem with no CBD treated, 0.01 mg/mL CBD treated, and 0.1 mg/mL CBD treated, respectively.
Figure 5B:
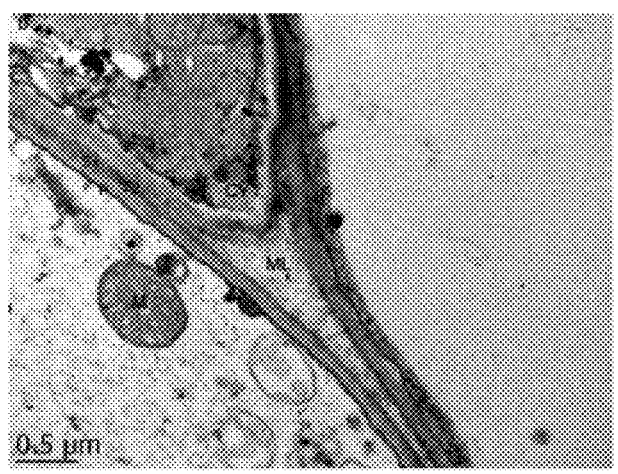
Figure 5C:
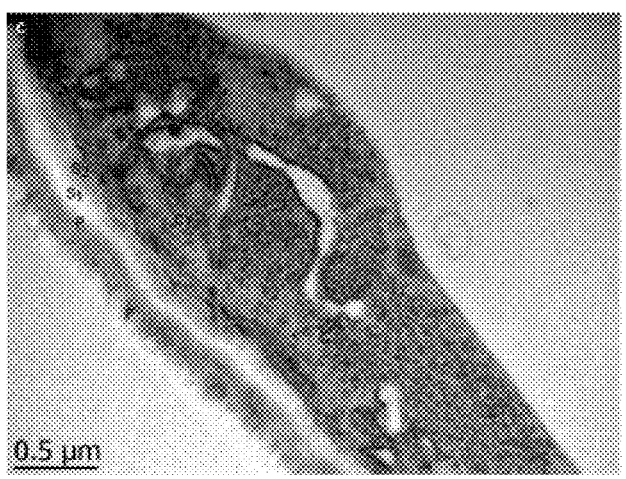
Figure 6:
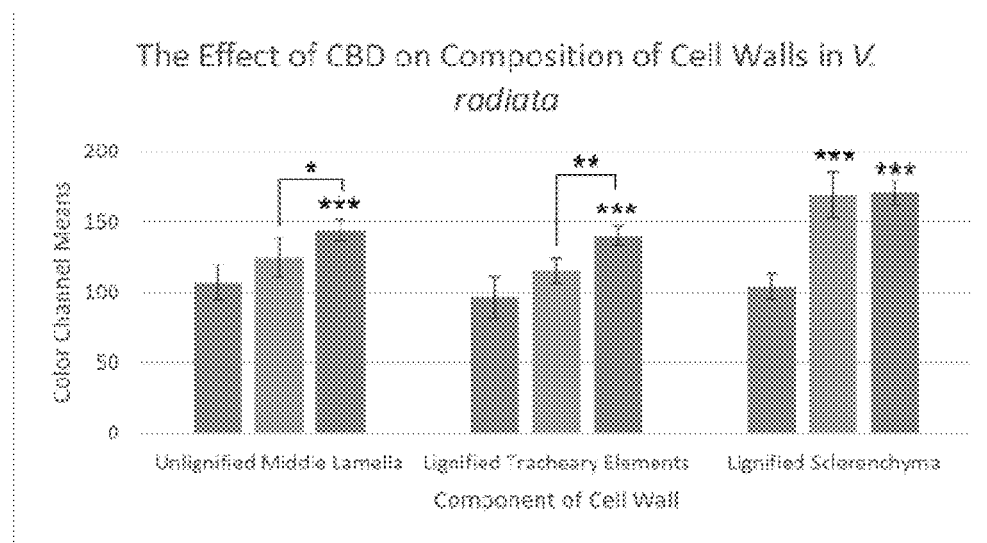
FIG. 6 shows the effects of CBD on composition of cell walls in *V. radiata*. Toluidine blue-O stained and sectioned mung beans were imaged, and color histograms were developed using ImageJ. Unlignified middle lamella was stained purple, lignified tracheary elements blue, and lignified sclerenchyma green. Blue bar is control, gray bar is single-administration (0.01 mg/mL CBD), orange bar is multiple-administration (0.01 mg/mL CBD). Bars are means±STDEV, n=8. *=$p<0.05$, =$p<0.01$, *=$p<0.001$.
Figure 7A:
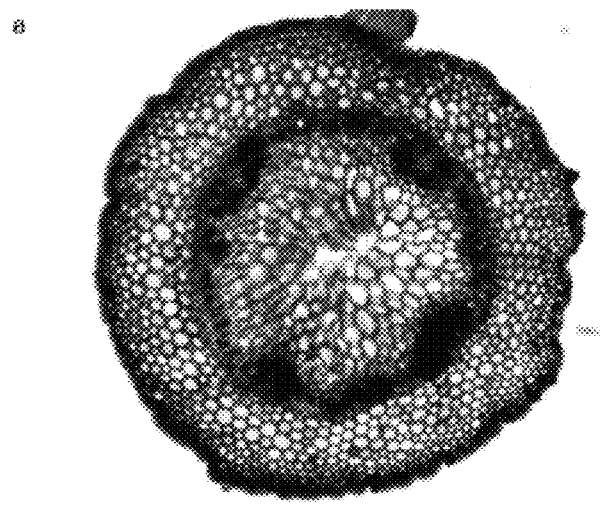
FIGS. 7a-7c show images of toluidine blue-O stained and sectioned mung beans, and color histograms were developed using ImageJ. Unlignified middle lamella was stained purple, lignified tracheary elements blue, and lignified sclerenchyma green. Blue bar is control, gray bar is single-administration (0.01 mg/mL CBD), orange bar is multiple-administration (0.01 mg/mL CBD). Bars are means±STDEV, n=8. *=$p<0.05$, =$p<0.01$, *=$p<0.001$.
Figure 7B:
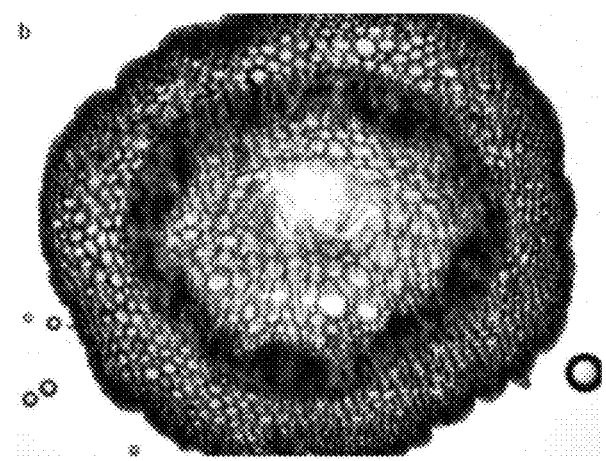
Figure 7C:
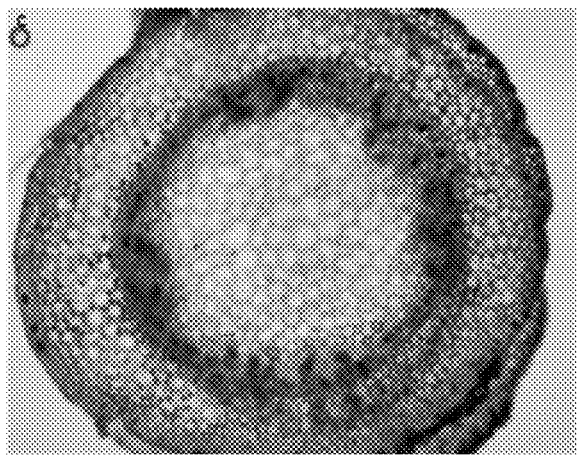
Figure 8A:
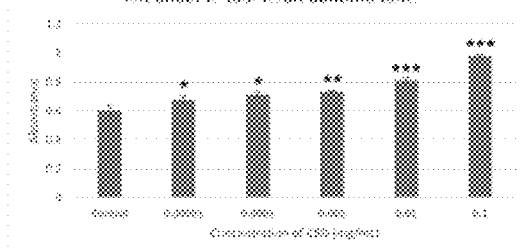
FIGS. 8a-8e show the effects of CBD on salicylic acid concentration, abscisic acid concentration, auxin concentration, cytokinin concentration, and gibberellic acid concentration, respectively. Lyophilized beans in PBS were used as samples for phytohormonal ELISAs.
Figure 8B:
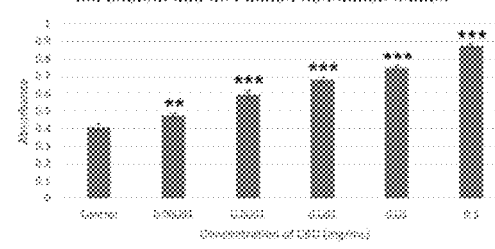
Figure 8C:
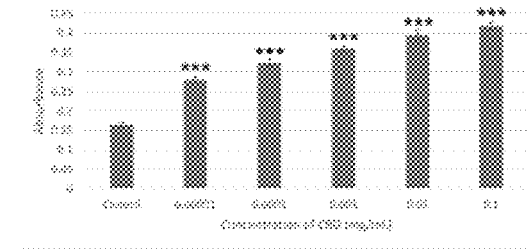
Figure 8D:
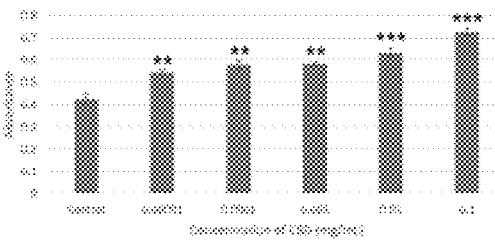
Figure 8E:
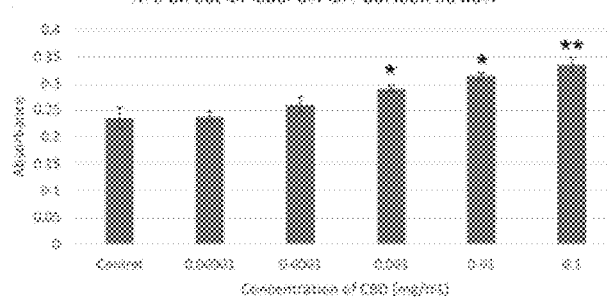

In transmission electron microscopy (FIGS. 5a-c), slices prepared by ultratomy of the stem-root junction of both 0.01 mg/mL and 0.1 mg/mL bolus dose plants were imaged along with a control sample. Data showed that the cell wall of treated plants was much thicker than that of the control, and in the 0.1 mg/mL sample some fibrillation was observed. Moreover, the middle lamellar space qualitatively increased in diameter between the control and the treated samples.

CBD Modulates Cell Wall Composition

In order to determine if CBD has an effect on the ratio of polymers composing the cell wall of treated plants, *V. radiata* treated with 0.01 mg/mL of CBD in both bolus dose and multiple administration as well as a control were sectioned at the midpoint of the stem and were stained with Toluidine Blue-O stain, a dye that stains unlignified middle lamella purple, lignified tracheary elements blue, and lignified sclerenchyma green. Images were taken with a light microscope, and the images were subsequently analyzed with ImageJ to develop color histograms for the RGB values. Data showed that all three components of the cell wall increased in color channel mean with CBD administration, with multiple administration significantly higher than bolus dose with regard to amount of polymer composition ($p<0.05$).

CBD Modulates Phytohormone Concentrations

In order to further elucidate the mechanism of action of CBD, beans treated in multiple administration with concentrations ranging from 0.00001 mg/mL to 0.1 mg/mL were lyophilized after being frozen at $-150°$ C. and homogenized in a mortar and pestle before being placed into a PBS 7.4 pH solution at 333 mg/mL. These solutions were used as the samples for a series of five phytohormone ELISAs in order to determine whether CBD has effects on the cellular level or only on the physical and microstructural one. The data demonstrated that all five phytohormones (salicylic acid, abscisic acid, auxin, cytokinins, and gibberellic acid) increased significantly in a dose-response fashion ($p<0.05$).

CBD-Chitosan Coatings Reduce Microbial Infection and Increase Mass of Seedlings

*V. radiata* were grown hydroponically using a previously unreported and original mechanism for administering CBD. A biodegradable chitosan seed coating containing the CBD4 protein was administered to the mung bean seeds. Long term storage of the seeds for agricultural purposes in developing countries would necessitate chitosan's antimicrobial effects and the addition of CBD's effect on increased biomass would prove enormously beneficial. To determine whether the antimicrobial effects of chitosan would apply to this method of application, a small aliquot of water from each well was taken and absorbance was measured at 630 nm as an indicator of microbial growth. The data demonstrates that beans with the chitosan coating had significantly reduced microbial growth as compared to both the control and the multiple administration method in a dose response fashion ($p<0.05$). The mass of the seedlings was also measured, demonstrating an increase in biomass compared to multiple administration of CBD ($p<0.05$) in a dose-response manner. This has significant implications in agriculture and has suggested new and innovative applications of a CBD-chitosan seed coating on *V. radiata*.

DISCUSSION

In the invention reported here, the enhanced growth effects of CBD when administered directly in the water supply of *V. radiata* as well as the through a CBD-chitosan seed coating were documented. This invention which results in an increase in the biomass and modulation in the development of the mung bean, has implications in various disciplines including biofuel production, agriculture, and manufacturing. The mechanism of action of CBD4 was also further elucidated in the invention described here, suggesting additional means of exploitation of the non-catalytic molecule. This invention is without genetic modification of the plant.

Microscopy analysis suggested that CBD alone alters the microstructure of the cell wall, decreasing crystallinity and fibrillating the microfibrils that compose it (FIGS. 4, 5). Previously, Benziman et al. ("Cellulose biogenesis: Polymerization and crystallization are coupled processes in *Acetobacter xylinum*" Proceedings of the National Academy of Sciences of the United States of America. 1980, Oct. 31 doi:10.1073/pnas.77.11.6678) demonstrated that crystallinity and polymerization "are coupled processes" in legumes. As previously mentioned, Abramson et al. (2009) have reported a modulated biomass following exogenous CBD treatment, with an increase suggested to be due to a reduction in both polymerization and crystallinity, leading to an increase in cellulose production. The increase in mass and diameter demonstrated following CBD treatment in the invention reported here may therefore be due to the decreasing crystallinity of synthesized cellulose microfibrils as suggested by electron microscopy and the increased mass of the amorphous cellulose as evidenced by the glucose assay. The increased thickness of the microfibrils may also increase material stiffness (FIG. 2b), suggesting an overall more durable and hardy specimen. The increase in number of amorphous microfibrils may also create an increase in non-reducing glucose ends, possibly being responsible for increasing the overall concentration of free D-glucose per unit mass that was observed (FIG. 1b).

Shpigel, et al. ("Bacterial cellulose-binding domain modulates in vitro elongation of different plant cells." *Plant physiology* 1998, Jul. 31, No doi) showed that CBD and xyloglucan endotransglycosylase (XET), a protein responsible for crosslinking cellulose fibers in the cell wall that is natively produced by plant cells, compete for cellulose binding in vivo. Meanwhile, Van Sandt, et al. ("Xyloglucan endotransglucosylase activity loosens a plant cell wall" *Annals of botany*. 2007, Nov. 30, doi:10.1093/aob/mcm248) found that excess XET in a plant at low concentrations generates a crystalline structure, lowering the overall amount of free glucose; while at sufficiently high concentrations, CBD activity outcompetes that of XET, reducing crystallinity. This could explain the dip and then rise observed in free glucose observed in the bolus dose process discussed herein (FIG. 1b). The rise, along with the increase in mass with the administration of CBD, resulted in an increase of more than 550% in free D-glucose compared to the untreated bean in the invention reported here (FIG. 1c).

Moreover, SEM micrographs suggest a qualitative difference between the apparent surface area of the stems of untreated beans and those treated with 0.01 mg/mL of CBD (FIGS. 4a, 4b), suggesting CBD leads to amorphogenesis and increased surface area available to promote hydrolysis reactions mediated by cellulases. This suggests increasing availability of free glucose significant in biofuel production and evidenced in FIG. 1c. This increase in surface area could also result in a decreased number of root hairs, as the minimum requirement of water is being met via absorption thorough microcracks as suggested in root hair examination data seen in FIG. 2c. An increase in water uptake may mediate resistance to silver nitrate through a mechanism of dilution of the toxin due to increased surface area of the bean in the invention reported here (FIGS. 3*a*, 3*b*). Bioremediation of this nature has tremendous implications in agriculture. Furthermore, viability data of human keratinocytes shows that CBD has no deleterious effect on cellular viability, suggesting that CBD does not act as a toxin unless at sufficiently high concentrations; in fact, CBD demonstrated a low-dose proliferative effect in vitro (FIG. 3*c*).

The hydroponic germination and growth of mung beans in the presence of CBD appears to affect the composition of the cell wall, modulating it beyond more fundamental morphological changes (FIGS. 6 and 7). One mechanism of determining changes cell wall development is by means of selective staining for certain components of the cell wall and quantifying the relative abundance of different cell wall elements. Modulation of cell wall composition can be explained in terms of the growth patterns of the respective elements; sclerenchyma and tracheary elements have maximum volumes at which they undergo apoptosis indicative of maturity, and acceleration of their growth results in early lignification, whereas the middle lamella continues to grow without limits, leading to greater quantity of unlignified cell wall and potential for additional growth.

Multiple-administration was found to be more effective than single, bolus administration for all assays. Perhaps in bolus dose administration an overwhelming quantity of CBD results in steric effects on developmental molecules. This steric interference may be circumvented by using smaller doses, repeatedly, as is prescribed in the multiple administration protocol. Competition with XET may also result in multiple-dose administration being more effective as a continuous source of CBD as well as XET may create growth conditions more conducive to the data collected perhaps through some epigenetic modification, but further research is necessary. It is still unclear as to whether CBD enters the cell, however imaging suggests it remains extracellular. Root hair count decreases more dramatically in multiple administration perhaps since microcracks in the cell wall appear more organized, potentially being more functional in the uptake of water.

Multiple-administration also displays more organized growth and development, as SEM images show that microfibrils appear to remain more crystalline regardless of their increased growth and developmental rate (FIG. 4). Phytohormonal assays demonstrate that CBD does have significant effects on the cellular and hormonal signal transduction pathways of the plant cell, showing that the mechanism is more systemically based than previously thought (FIG. 8), but with a mechanism unknown. Prior to this study no molecular investigations of CBD's mechanism had been conducted; hence, this study is the first reported case of CBD eliciting fundamental transformations in the phytohormonal signaling in *V. radiata*. While far more data is necessary to develop a conclusion as to the true root of CBD's mechanism, recent insights into the pathways of such phytohormones will assist in further studies involving this subject.

Last, chitosan seed coatings have already been shown to be a very promising potential solution to the commercialization problem, providing an economic and simple method of mass-producing and distributing CBD on a large scale conducive with potential of long term storage. Chitosan alone has already been shown to reduce microbial growth on plants (Hadrami, A., Adam, L., Hadrami, I., & Daayf, F. (2010). Chitosan in Plant Protection. Marine Drugs, 8(4). doi:10.3390/md8040968), but evidence of additive effects between chitosan and CBD amplify this desirable property (FIG. 9*a*). In addition, likely as a result of the decrease in microbial growth as well as greater retention of water in the interior of the chitosan matrix, the mass of the seedling increased in turn (FIG. 9*b*). In this fashion, chitosan seed coatings provide a means of producing CBD's effects while maintaining a cost efficient and convenient manner of administration, as well as offering an ideal storage strategy for seeds through prevention of microbial growth.

What is claimed is:

1. A seed coated by a cellulose binding domain (CBD) polypeptide and chitosan, wherein the CBD polypeptide is cellulose binding domain 4 (CBD4).

2. The seed of claim 1, wherein the seed is a *Vigna radiata* seed.

3. The seed of claim 2, wherein the seed is coated by contacting an uncoated seed with a solution of the CBD polypeptide and chitosan.

4. The seed of claim 3, wherein the solution has a CBD concentration of about 0.01 mg/mL, and a chitosan solution of about 0.2 M.

5. The seed of claim 1, wherein the seed is coated by contacting an uncoated seed with a solution of the CBD polypeptide and chitosan.

6. The seed of claim 5, wherein the solution has a CBD concentration of about 0.01 mg/mL, and a chitosan solution of about 0.2 M.

7. A method to coat a seed, comprising: contacting a seed with a solution comprising chitosan and cellulose binding domain polypeptide, wherein the cellulose binding domain polypeptide is cellulose binding domain 4 (CBD4).

8. The method of claim 7, wherein the seed is a *Vigna radiata* seed.

9. The method of claim 7, wherein the said solution has a CBD concentration of about 0.01 mg/mL and a chitosan concentration of about 0.2 M.

10. A method of cultivating a plant, comprising:

(A) coating a seed comprising contacting a seed with a solution comprising chitosan and cellulose binding domain polypeptide, wherein the cellulose binding domain polypeptide is cellulose binding domain 4 (CBD4), and (B) growing the seed for agriculture or biofuel production.

11. The method of claim 10, wherein the solution has a CBD concentration of about 0.01 mg/mL, and a chitosan solution of about 0.2M.

12. The method of claim 11, wherein the seed is grown either hydroponically or in soil.

13. The method of claim 11, wherein the seed is grown in chemically or biologically contaminated water or soil.

* * * * *